(12) United States Patent
Horng et al.

(10) Patent No.: US 6,983,531 B2
(45) Date of Patent: Jan. 10, 2006

(54) SPIN VALVE HEAD HAVING LEAD OVERLAY

(75) Inventors: Cheng T. Horng, San Jose, CA (US); Ru-Ying Tong, San Jose, CA (US); Kochan Ju, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 43 days.

(21) Appl. No.: 10/674,572

(22) Filed: Sep. 30, 2003

(65) Prior Publication Data

US 2004/0060166 A1    Apr. 1, 2004

Related U.S. Application Data

(62) Division of application No. 09/747,234, filed on Dec. 26, 2000, now Pat. No. 6,634,087.

(51) Int. Cl.
    *G11B 5/127*    (2006.01)
    *G11B 5/33*     (2006.01)

(52) U.S. Cl. .................. 29/603.14; 360/324.1; 360/324.12; 365/158; 216/22

(58) Field of Classification Search .......... 360/320, 360/324.1, 322, 72.1, 324.12; 216/22; 365/158; 29/603.14
    See application file for complete search history.

(56) References Cited

U.S. PATENT DOCUMENTS

| | | | | |
|---|---|---|---|---|
| 5,491,600 A | * | 2/1996 | Chen et al. | 360/322 |
| 5,862,022 A | * | 1/1999 | Noguchi et al. | 365/158 |
| 5,966,273 A | * | 10/1999 | Matsumoto et al. | 360/320 |
| 5,978,183 A | * | 11/1999 | Hsiao et al. | 360/322 |
| 5,985,162 A | * | 11/1999 | Han et al. | 216/22 |
| 6,007,731 A | * | 12/1999 | Han et al. | 216/22 |
| 6,103,136 A | * | 8/2000 | Han et al. | 216/22 |
| 6,162,582 A | * | 12/2000 | Hsiao et al. | 360/322 |
| 6,195,229 B1 | * | 2/2001 | Shen et al. | 360/72.1 |
| 6,226,158 B1 | * | 5/2001 | Pinarbasi | 360/322 |
| 6,614,630 B2 | * | 9/2003 | Horng et al. | 360/324.12 |
| 6,714,387 B1 | * | 3/2004 | Horng et al. | 360/320 |
| 6,785,954 B2 | * | 9/2004 | Horng et al. | 29/603.14 |
| 6,798,622 B2 | * | 9/2004 | Ju et al. | 360/322 |
| 2003/0202295 A1 | * | 10/2003 | Wang et al. | 360/324.12 |
| 2005/0068685 A1 | * | 3/2005 | Gill | 360/324.1 |
| 2005/0094321 A1 | * | 5/2005 | Ju et al. | 360/324.1 |
| 2005/0094325 A1 | * | 5/2005 | Ju et al. | 360/324.1 |

* cited by examiner

*Primary Examiner*—Ljiljana Ciric
(74) *Attorney, Agent, or Firm*—George O. Saile; Stephen B. Ackerman

(57) ABSTRACT

A GMR read head is described. The device comprises a spin valve stack whose top layer is a first capping layer. On the first capping layer are two additional layers, a lead overlay layer and a second capping layer. These are divided into two opposing portions, separated from each other by a trench that is filled with a dielectric. A bias layer and a conductive lead layer contact the stack on its sidewalls.

11 Claims, 6 Drawing Sheets

SPIN VALVE HEAD HAVING LEAD OVERLAY

This is a division of patent application Ser. No. 09/747,234, filing date Dec. 26, 2000 now U.S. Pat. No. 6,634,087, Spin Valve Head Having Lead Overlay, assigned to the same assignee as the present invention.

FIELD OF THE INVENTION

The invention relates to the general field of magnetic read heads with particular reference to GMR structures for use in reading data recorded at densities in the 100 Gb per sq. in. range.

BACKGROUND OF THE INVENTION

Requirements on transducers for ultra-high recording densities (greater than 60 $Gb/in^2$) place certain constraints on the properties of the read and write heads needed to achieve this. These fundamental constraints have a profound influence on the design and fabrication of the read/write transducers. To achieve extremely high recording densities, Giant Magnetoresistance (GMR) reader design has to be capable of very high linear bit density (BPI) and also very high track density (TPI). Consequently, GMR devices continue to be pushed to narrower track widths and to thinner free layers to maintain high signal output in spite of reductions in track width and reduced gap length.

A critical issue for a very narrow track width is possible large amplitude and sensor stability loss. One approach that has been proposed to alleviate the amplitude loss and sensor stability concern is to use a lead overlay design. In lead overlay design, MR sensor track width is defined by conductor lead edge while the contiguous hard bias junction is placed outside the lead overlay.

For reader device situated within a reduced gap (i.e. thin upper dielectric layer), lead overlay topography becomes very critical. The bi-layer resist structure for conductor lift-off is normally made with an undercut in the bottom resist layer. For a very narrow track width, there is no room for creating this resist undercut so conductor lead structures formed using conventional lift-off process are exposed to a high probability of ending up with bridging conductor leads as well as conductor lead fencing. The former results in current shunting, while the latter leads to sensor to shield shorts. Additionally, lead overlays formed during a conductor lead lift-off process is usually associated with poor contact resistance at the lead overlay and GMR interface.

In the present invention the bias and conductor lead substructures are formed without the use of a liftoff process.

A routine search of the prior art was performed with the following references of interest being found: U.S. Pat. No. 5,985,162 (Han et al.), U.S. Pat. No. 6,103,136 (Han et al.), and U.S. Pat. No. 6,007,731 (Han et al.) all show lead lift off processes. In U.S. Pat. No. 5,966,273, Matsumoto et al. show a lead process while in U.S. Pat. No. 5,491,600, Chen et al. show a multi-layered lead and associated process.

SUMMARY OF THE INVENTION

It has been an object of the present invention to provide a spin valve magnetic read head suitable for use with ultra-high recording densities, Another object of the invention has been to provide a process for the manufacture of said read head.

A further object has been that said process produce a product that is free of conductor lead bridging, conductor lead fencing, and contact resistance at the lead overlayer and GMR structure interface.

These objects have been achieved by means of a process wherein a first capping layer is deposited through DC sputtering and, without breaking vacuum, a lead overlay layer is then deposited on the first capping layer. This is followed by deposition, also by DC sputtering, of a second capping layer which is patterned so that it becomes a hard mask. Then, using this hard mask, the lead overlay layer is removed from the center of the structure by means of ion beam etching. The hard bias and conductor lead layers are then formed inside parallel trenches with the use of liftoff processes.

DESCRIPTION OF THE PREFERRED EMBODIMENTS

It is important to note that the order in which the various layers of the present invention are deposited as well as the thicknesses specified for them are critical, as opposed to optimal. A structure having the same set of layers as the present invention, but having one or more whose thicknesses lie outside the specified ranges, will not operate properly. It may also be possible to form structures having the same layers, with the same thicknesses in the same order, as those of the present invention but formed using one or more different sub-processes (such as liftoff instead of subtractive etching). Such structures will, in general, have a production yield and operating reliability that is different from that of devices made by following all the teachings of the present invention.

Figure 9:
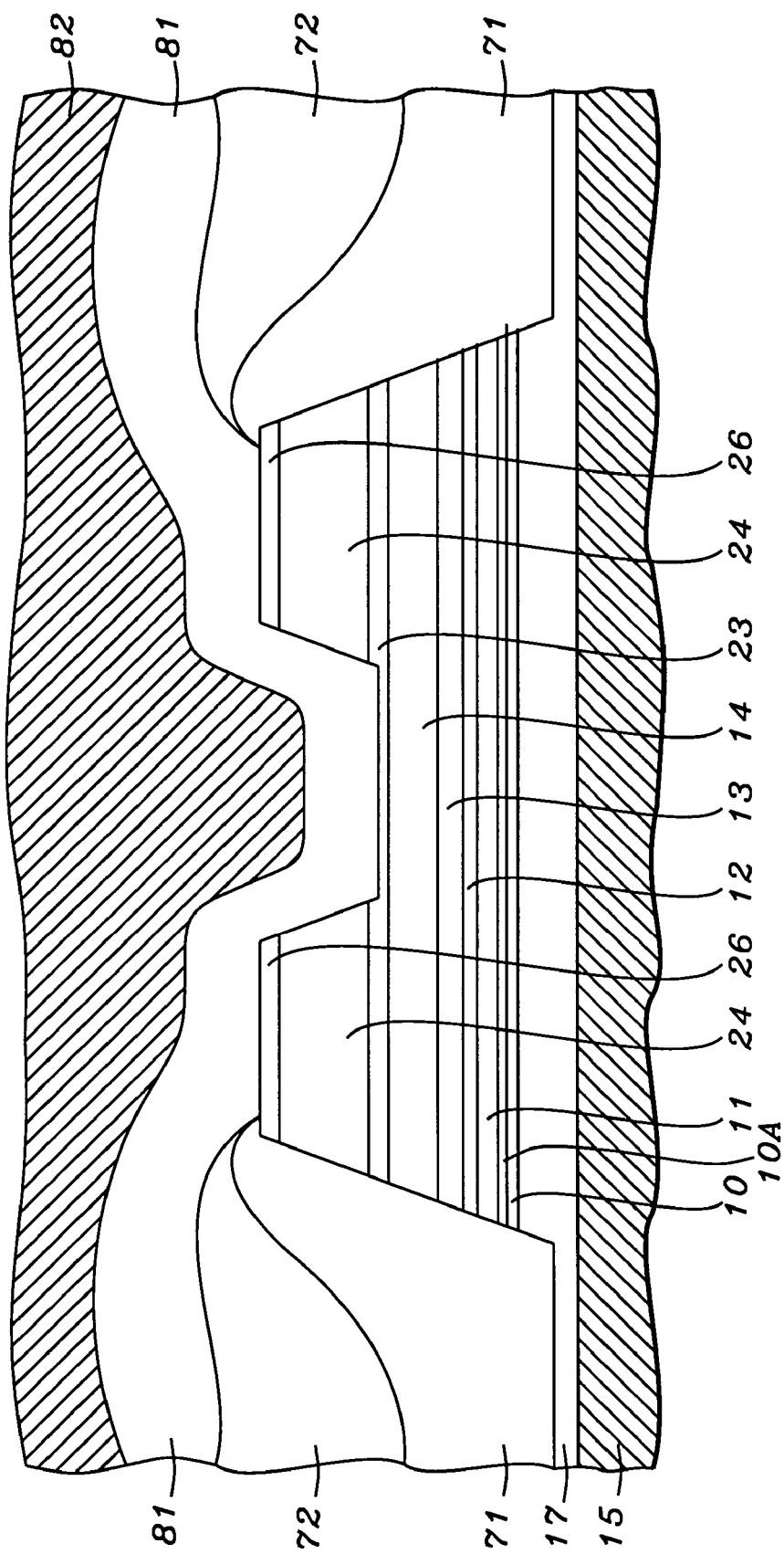
FIG. 9 shows both edges of the completed structure.

We now describe the present invention in terms of the process used for its manufacture. This description will also serve to clarify the structure of the present invention. For convenience, only the right hand side of the device has been shown in FIGS. 1 through 8. A fuller visualization of the structure may be obtained by jumping ahead to FIG. 9 which shows both ends of the structure.

Figure 1:
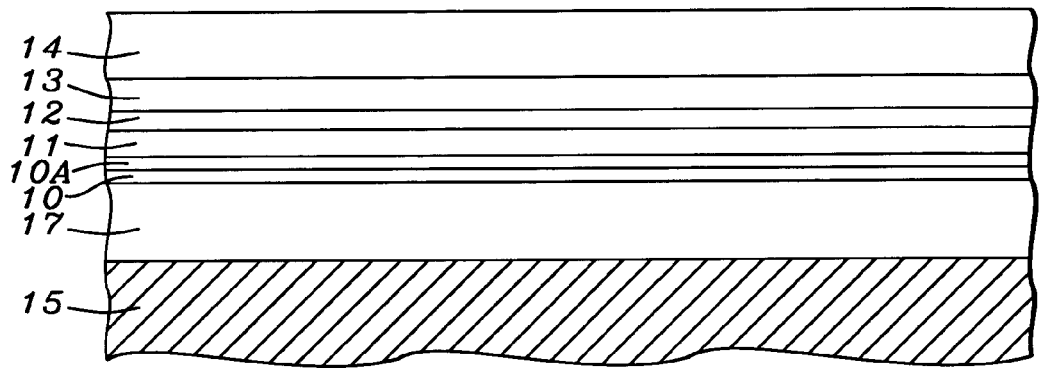
FIG. 1 illustrates the basic layer structure of the spin valve portion of the device that constitutes the present invention.

We begin our description by referring to FIG. 1. The process begins with the provision of lower magnetic shield layer 15. On this is deposited the lower dielectric layer 17 to a thickness between about 120 and 160 Angstroms. More specifically, layer 17 is formed by first depositing a layer of tantalum (not shown), converting it to tantalum oxide, and then depositing a layer of aluminum oxide on this tantalum oxide layer. With layer 17 in place, the next step is the deposition of seed layer 10 (for which we have used nickel-chromium but other materials such as nickel-iron-chromium could also have been used). The thickness of layer 10 is between about 40 and 60 Angstroms.

The next layer to be deposited is free layer 11 onto which is deposited layer of non-magnetic material 12 (typically copper). This is followed by synthetic antiferromagnetic pinned layer 13 onto which is deposited the final layer (for the basic spin valve portion of the device) which is manganese platinum layer 14. Layer 13 consists of a layer of cobalt iron between about 15 and 25 Angstroms thick followed by a spacer layer (not shown) that is a layer of ruthenium between about 6 and 9 Angstroms thick and a layer of cobalt-iron (also not shown) between about 15 and 25 Angstroms thick. Layers 13 and 14 together form the pinned layer portion of the device.

Figure 2:
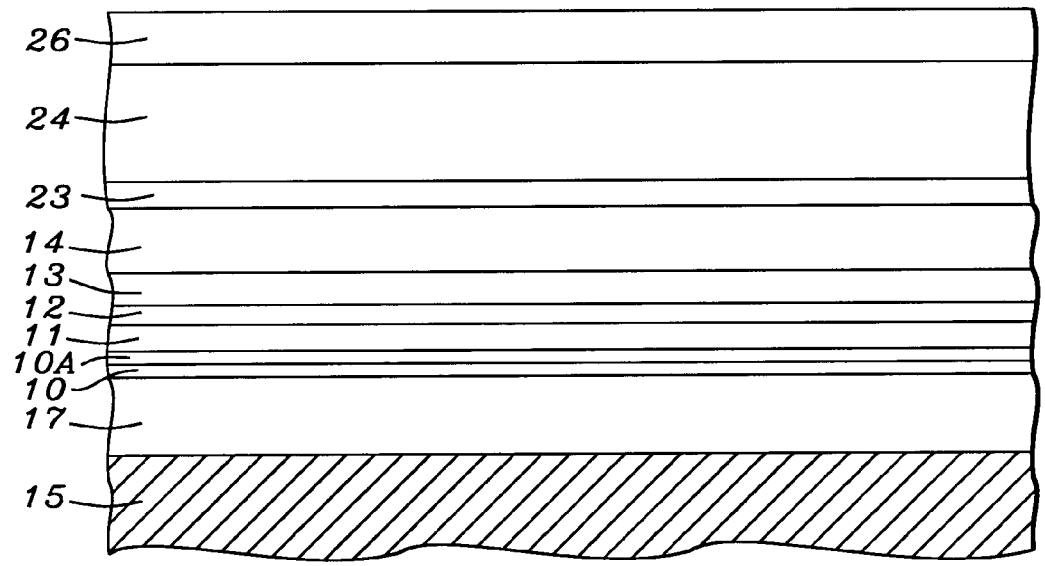
FIG. 2 shows the structure of FIG. 1 after the addition of a lead overlay layer that is sandwiched between two capping layers.

Referring now to FIG. 2, capping layer 23 is deposited onto layer 14. A requirement for capping layer 23 is that it have a low IBE (ion beam etching) rate while still being subject to RIE (reactive ion etching). Our preferred material for this has been tantalum because it is already one of the components of a GMR configuration, but similar materials such titanium or tungsten could also have been used. It is between about 50 and 70 Angstroms thick, and it is a key feature of the invention that this layer be deposited through DC sputtering and that, without breaking vacuum, lead overlay layer 24 is deposited onto capping layer 23 and, again through DC sputtering and still without breaking vacuum, a second capping layer 26 (also of tantalum between about 150 and 250 Angstroms thick) is deposited onto lead overlay layer 24. More specifically, the term 'without breaking vacuum', as used here, implies maintaining a pressure (other than the partial pressure of the sputtering gases) that is no greater than about $10^{-6}$ torr. Our preferred material for lead overlay layer 24 has been gold deposited to a thickness between about 200 and 300 Angstroms, but other materials, such as copper (between about 150 and 250 Angstroms thick) could also have been used.

Figure 3:
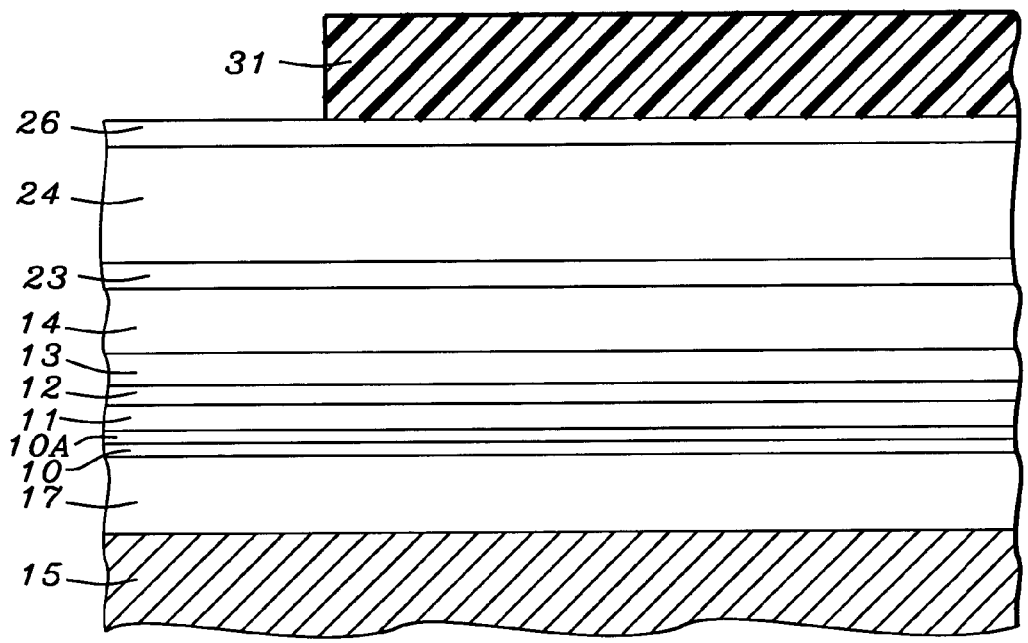
FIGS. 3–5 illustrate how the central trench is etched with the upper cap layer used as a hard mask.
Figure 4:
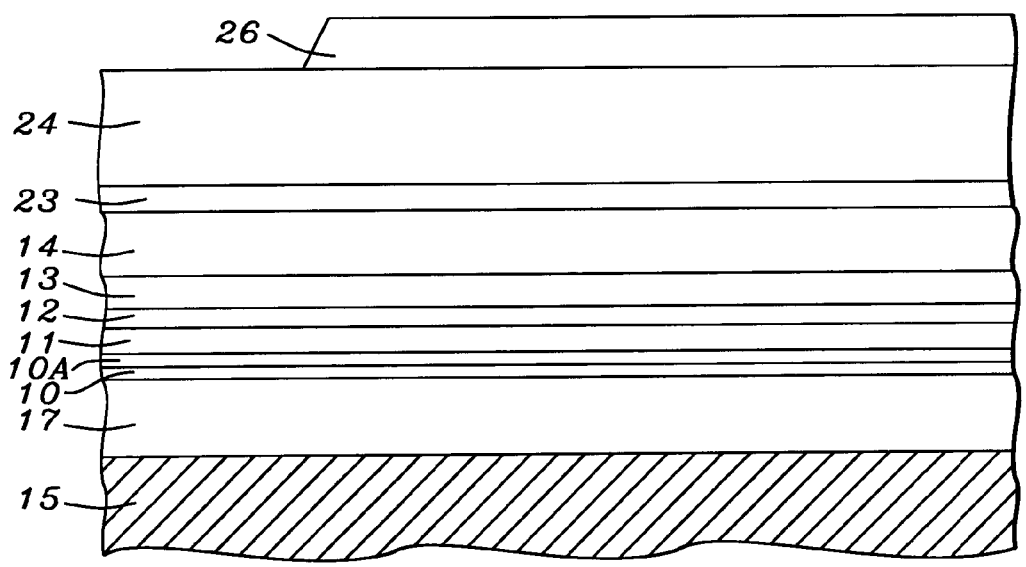
Figure 5:
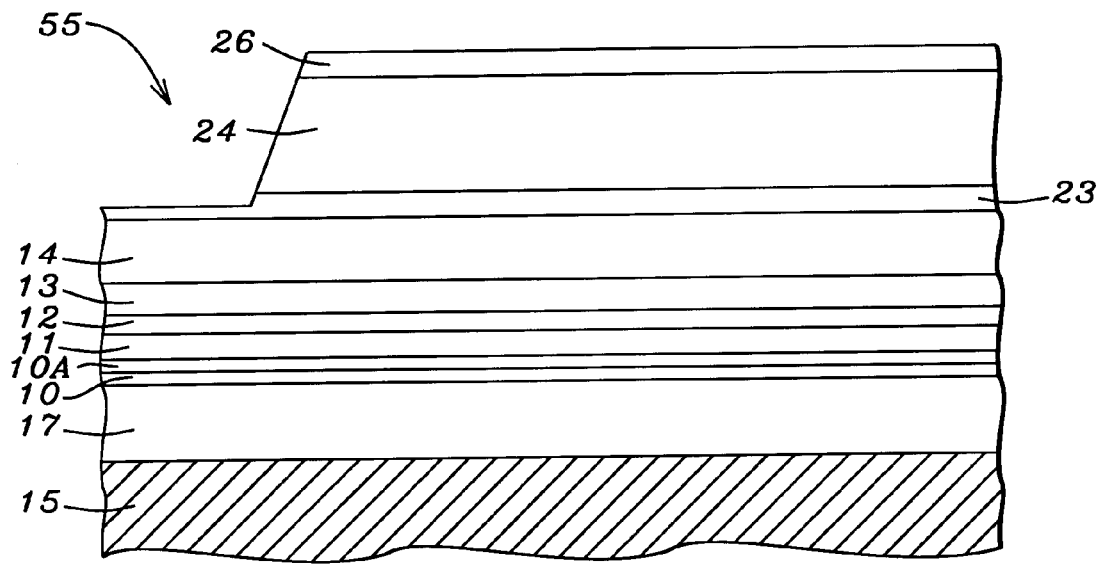

Next, as illustrated in FIG. 3, capping layer 26 is coated with photoresist layer 31 which is patterned to define a centrally located trench following which layer 26 is RIE etched using trifluoro methane, so that it becomes a hard mask as shown in FIG. 4. Then, using this hard mask, IBE is used to form centrally located trench 55, as shown in FIG. 5. Trench 55 has sidewalls that slope by no more than 45 degrees away from vertical and its depth is such that all unprotected portions of lead overlay layer 24 are removed as well as portions of both capping layers. This is the result of intentionally over-etching so that about 70% of layer 26 and about 50% of layer 23 get removed during this step.

At this stage in the process the wafer (of which the device is a part), is annealed so that the pinned layer direction can be set up. Annealing conditions are heating for between about 5 and 10 hours at a temperature between about 250 and 280° C. in the presence of a magnetic field whose strength is between about 6,000 and 10,000 Oersted. Additionally, this heat treatment causes some diffusion of both tantalum capping layers into overlay layer 24 which results in a strengthening of the overlay layer.

Figure 6:
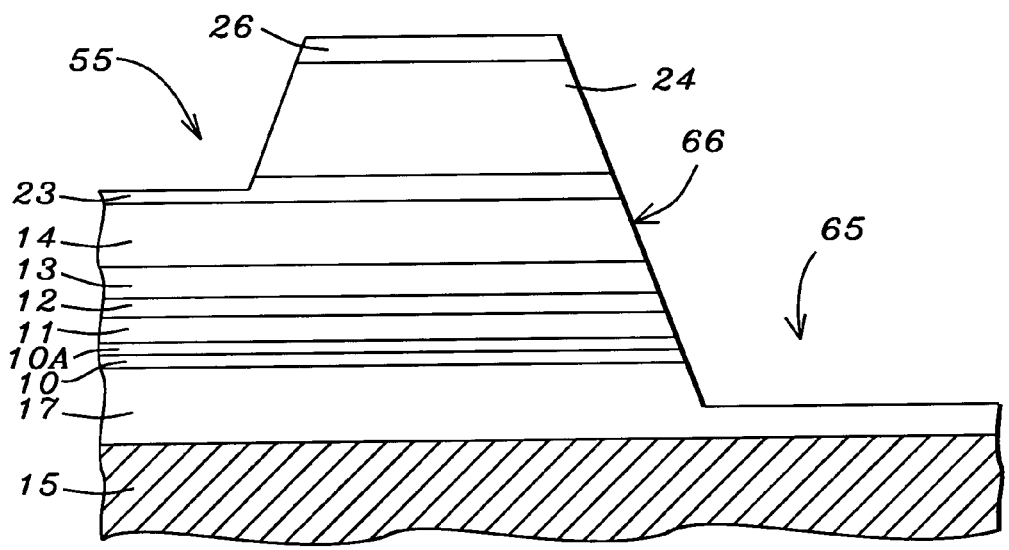
FIG. 6 shows the etching of the two outer trenches.

Referring now to FIG. 6, the GPC (GMR/Permant magnet/Conductor lead) process is used for the formation of the hard bias and conductor leads. Using a lift-off resist pattern to define trenches 65, IBE is used to form the trenches 65. These are two trenches that run parallel to trench 55, being symmetrically disposed on either side thereof and separated therefrom by between about 0.1 and 0.15 microns. Trenches 65, being formed by IBE, extend downwards to a depth such that a small portion of lower dielectric layer 17 is removed. These trenches have sloping sidewalls that slopes no more than 30 degrees below horizontal.

Figure 7:
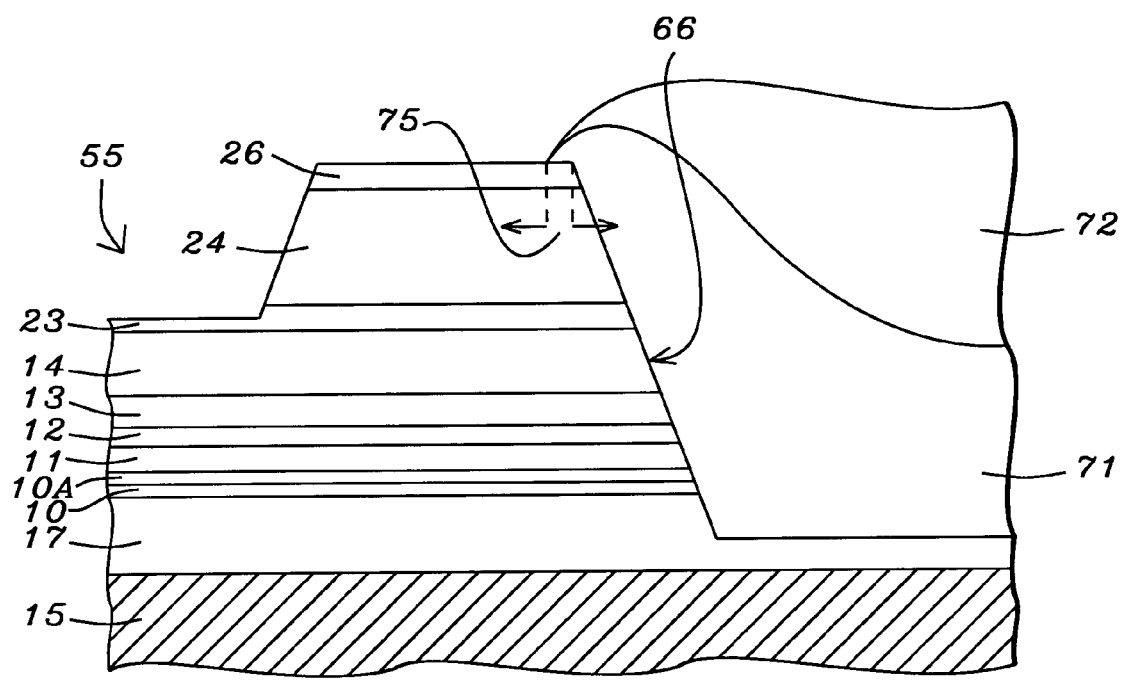
FIG. 7 shows FIG. 6 after deposition of the hard bias and conductor lead layers.
Figure 8:
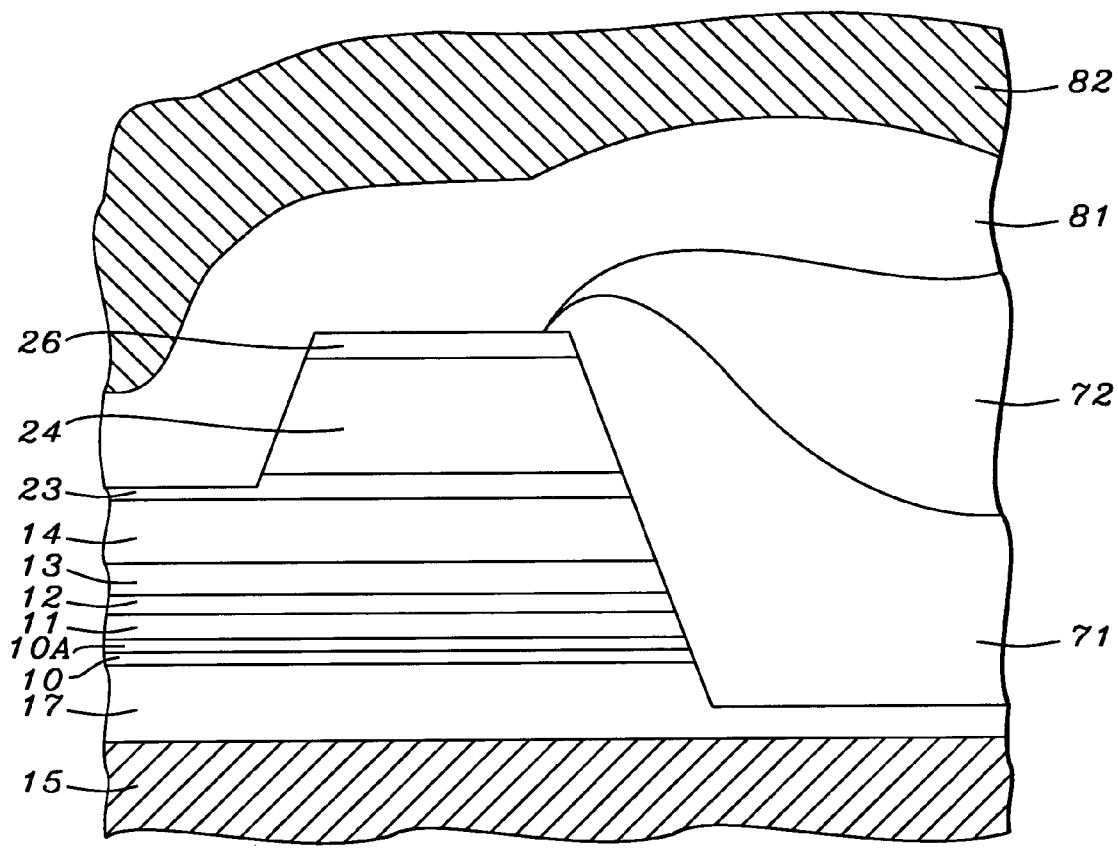
FIG. 8 shows the completed structure.

Referring now to FIG. 7, a layer of hard bias material 71 is then deposited inside trenches 65 to a thickness sufficient to partly fill these trenches and to also fully coat sloping sidewalls 66. After hard bias layer deposition, conductor lead layers such as Ta/Au/Ta are then deposited. The conductive lead layers being confined to inside trenches 65 except for a small amount of overlap 75 of upper capping layer 26, as shown in FIG. 7. The conductor lead layer 72 is selectively deposited over bias layer 71 to a thickness that is sufficient to overfill trenches 65 without increasing the magnitude of overlap 75. To minimize the overlap, hard bias and conductive lead layers are, preferably, deposited through ion beam deposition (IBD).

The process of the present invention then concludes with successive depositions of upper dielectric layer 81 and upper magnetic shield 82, over the entire wafer.

Experimental Confirmation

After completing a device using the lead overlay process described above, magnetic performance properties of this device was compared with a reference GMR unit. The results are listed in TABLE I below:

TABLE I

| Structure: NiFe 82%, MnPt 43% | Bs | Hc | He | Hk | Rs | Dr/r | Dr |
|---|---|---|---|---|---|---|---|
| NiCr55/BCL5/Cu5/NiFe15/ CoFe10/Cu20/Cofe19/ Ru7.5/CoFe21/MnPt120/ Ta50(reference) | 0.23 | 7.7 | −3.4 | 6.4 | 19.1 | 12.6 | 2.40 |
| NiCr55/BCL5/Cu5/NiFe15/ CoFe10/Cu20/Cofe19/ Ru7.5/CoFe21/MnPt120/ Ta50/Cu250/Ta200 | | | | | 1.5 | | |
| After removing 200 Å of Ta by reactive ion etching | | | | | 1.6 | | |
| After ion beam etching to remove copper | 0.24 | 7.7 | −2.2 | 9.0 | 18.9 | 13.2 | 2.49 | where Bs = free layer moment,
Hc = coercivity,
He = inter-layer coupling field,
Hk = anisotropy field,
Rs = GMR sheet resistance,
BCL = Ru With the presence of the lead overlay layers, the sheet resistance is 1.5 ohm/sq. After IBE to remove Cu lead overlay, Rs of the GMR stack is 18.9 ohm/sq. The Rs is equivalent to that of the reference GMR stack. Other magnetic properties of the lead overlaid wafer are also equivalent to the reference wafer. Thus, the subtractive lead overlay process does not create damage to the GMR sensor.

For a 150Å Cu lead overlay, the resistance aspect ratio between the GMR and Exchange/Lead Overlay is around 6.0. Thus, the lead overlay is a low resistance path for conducting the sensor current.

While the invention has been particularly shown and described with reference to the preferred embodiments thereof, it will be understood by those skilled in the art that various changes in form and details may be made without departing from the spirit and scope of the invention.

What is claimed is:
1. A GMR read head device, comprising:
a lower dielectric layer on a lower magnetic shield layer;
on the lower dielectric layer, a seed layer on which is a buffer layer;
on the buffer layer, a free layer on which is a layer of non-magnetic material;

on the non-magnetic layer, a two layer laminate that serves as a pinned layer;

on the pinned layer, a first capping layer having an upper surface;

on the first capping layer a lead overlay layer on which is a second capping layer;

centrally located within the device, a first trench that extends downwards through the lead overlay layer as far as a first distance below the upper surface of the first capping layer, said first trench having a 45 degree sidewall;

a pair of second trenches, symmetrically disposed on either side of the first trench, separated from said first trench by a spacing, that extend downwards a second distance into the first dielectric layer, said pair of second trenches having sloping sidewalls;

a layer of hard bias material in the second trenches and that fully coats said sloping sidewalls and that partly overlaps said second capping layer;

a layer of conductor lead material that exactly overlays the layer of hard bias material and that overfills the second trenches; and a second dielectric layer that covers the first trench, the second capping layer, and the conductor lead layer.

2. The device described in claim 1 wherein the seed layer is selected from the group consisting of nickel-chromium and nickel-iron-chromium.

3. The device described in claim 1 wherein the buffer layer further comprises a layer of ruthenium between 5 and 7 Angstroms thick and a layer of copper between 5 and 10 Angstroms thick.

4. The device described in claim 1 wherein the multi-layer laminate that is suitable for use as a pinned layer further comprises, in order, layers of cobalt-iron, ruthenium, cobalt-iron, and manganese platinum.

5. The device described in claim 1 wherein the first capping layer is selected from the group consisting of tantalum, titanium, and tungsten and is between 50 and 70 Angstroms thick.

6. The device described in claim 1 wherein the lead overlay layer is selected from the group consisting of gold and copper, and is between 200 and 300 Angstroms thick.

7. The device described in claim 1 wherein the second capping layer is selected from the group consisting of tantalum, titanium, tungsten, and silicon and is between 150 and 250 Angstroms thick.

8. The device described in claim 1 wherein said first distance below the upper shield and the surface of the first capping layer is between 140 and 160 Angstroms.

9. The device described in claim 1 wherein said second distance into the first dielectric layer is between 30 and 40 Angstroms.

10. The device described in claim 1 wherein the spacing that separates the first trench from each of the second trenches is between 0.1 and 0.15 microns.

11. The device described in claim 1 wherein the first trench has sidewalls that slope by no more than 45 degrees away from vertical and the second trenches have sidewalls that slope by at least 60 degrees away from vertical.

* * * * *